United States Patent [19]
Schmitzer

[11] 3,986,035
[45] Oct. 12, 1976

[54] VACUUM FILM HOLDER FOR X-RAY FILMS AND INTENSIFYING FOILS

[76] Inventor: Andreas Schmitzer, Rebenweg 41, Kelheim (Danube), Germany

[22] Filed: Dec. 24, 1974

[21] Appl. No.: 536,150

Related U.S. Application Data

[63] Continuation of Ser. No. 343,982, March 22, 1973, abandoned.

[30] Foreign Application Priority Data

Mar. 25, 1972 Germany............................ 2214613

[52] U.S. Cl................................ 250/480; 250/482
[51] Int. Cl.².................................... G03D 13/08
[58] Field of Search ............. 250/475, 480, 481, 482

[56] References Cited
UNITED STATES PATENTS

| | | | |
|---|---|---|---|
| 2,371,843 | 3/1945 | Powers | 250/480 |
| 2,566,266 | 8/1951 | Uhle et al. | 250/480 |
| 2,796,526 | 6/1957 | Lusebrink | 250/481 |
| 3,291,984 | 12/1966 | Wasser | 250/480 |
| 3,327,115 | 6/1967 | Bartlett | 250/480 |
| 3,348,042 | 10/1968 | Umberg | 250/480 |
| 3,392,281 | 7/1968 | Sherwood | 250/480 |
| 3,412,244 | 11/1968 | Sherwood | 250/480 |
| 3,569,700 | 3/1971 | Quinn | 250/480 |

*Primary Examiner*—Alfred E. Smith
*Assistant Examiner*—Bruce C. Anderson
*Attorney, Agent, or Firm*—Erwin Salzer

[57] ABSTRACT

A vacuum film holder for housing X-ray films and intensifying foils for radiographic purposes comprises two separate superimposed plates for sandwiching therebetween X-ray sensitive films and intensifying foils and an elastomeric sealing body arranged in the gap formed between the plates and surrounding a predetermined area. The sealing body is affixed to one of the plates and engages under pressure the other of said plates in response to evacuation of the cavity formed between the pair of plates.

4 Claims, 2 Drawing Figures

VACUUM FILM HOLDER FOR X-RAY FILMS AND INTENSIFYING FOILS

This is a continuation of application Ser. No. 343,982, filed Mar. 22, 1973, now abandoned.

BACKGROUND OF THE INVENTION

An essential requirement for film holders for radiographic purposes consists in that the film proper and its intensifying foils must hug each other closely and be maintained strictly planar.

Conventional film holders for the purpose in hand include two complementary box-like portions which are connected together by a hinge and include a lining of foam rubber, or the like substance. The aforementioned lining engages the intensifying foil and presses the latter against the X-ray film proper. Film holders of this description are subject to several drawbacks. There is no assurance that the pressure exerted by the foam rubber or like lining is sufficiently uniform over the entire areas of films and foils. Moreover, linings of foam substances are subject to ageing, i.e. their resiliency and thickness are subject to change, and thus sooner or later lose their ability to function as intended.

The above drawback of film holders having foam rubber or the like linings or backings was conducive to the development of vacuum film holders.

In an attempt to avoid some of the many troubles encountered with vacuum film holders for radiographic applications, film holders have been designed which are substantially in the form of a plastic hose. A film sandwiched between a pair of intensifying foils is inserted into such a hose-type film holder, whereupon the latter is evacuated. One problem arising out of the use of such film holders consists in that the hose must be sealed upon evacuation thereof which, in the instant case, is a time consuming step. The use of hose-type film holders is also expensive because they can only be used once, and then must be discarded.

It is the principal object of the invention to provide vacuum film holders for radiography which are not subject to the drawbacks and limitations of prior art film holders, and more particularly the prior art film holders which have been described above.

SUMMARY OF THE INVENTION

Vacuum film holders embodying this invention include a pair of separate superimposed plates having juxtaposed planar clamping surfaces in the center regions thereof for sandwiching and clamping therebetween X-ray films and intensifying foils. Such film holders further include a sealing body having a considerably larger width measured in a direction parallel to the planes defined by said clamping surfaces than thickness measured in a direction at right angles to the planes defined by said clamping surfaces. The aforementioned sealing body is affixed to one of said pair of plates and engages under pressure the other of said pair of plates in response to evacuation of the space jointly bounded by said pair of plates and said sealing body.

DESCRIPTION OF PREFERRED EMBODIMENTS

Figure 1:
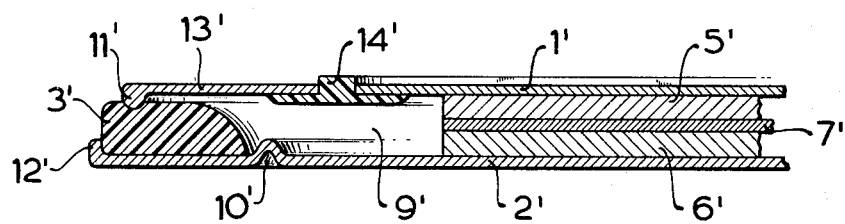
FIG. 1 is a vertical section of portion of a film holder embodying this invention, the remaining portion of the film holder being broken away.
Figure 2:
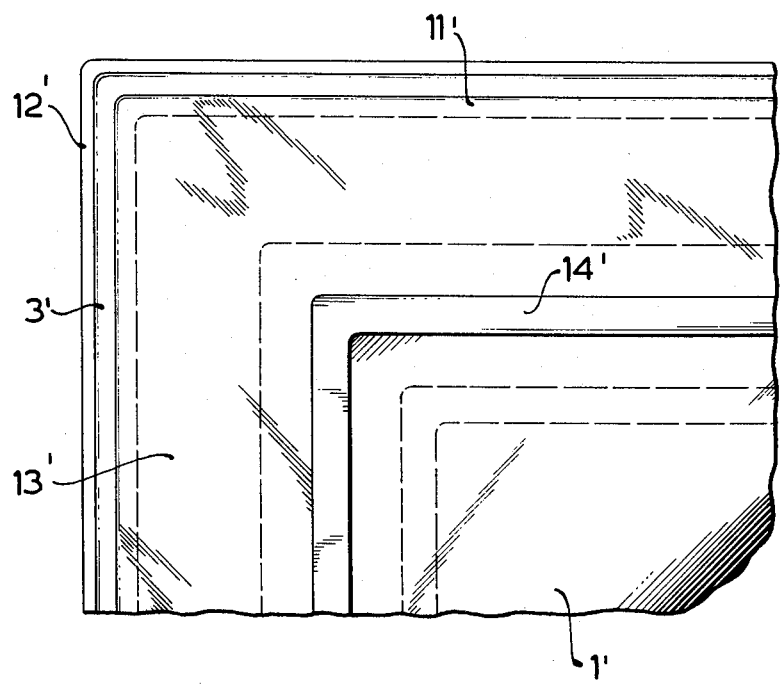
FIG. 2 is a top plan view of a portion of the structure shown in FIG. 1 the remaining portion of the film holder being broken away.

Referring now to the drawings, and more particularly to FIGS. 1 and 2 thereof, numeral 2' has been applied to indicate a lower plate and numeral 1' has been applied to indicate an upper plate. Both plates have planar surfaces, i.e. all their surfaces are planar. The size of the upper plate 1' is slightly less than the size of the lower plate 2' so that the lower plate projects beyond the outer circumference of the upper plate 1'.

The structure shown in FIGS. 1 and 2 allows to minimize the weight and the bulk of the plate holders, and to maximize the dimensional stability thereof. The increase of dimensional stability makes it possible to effectively avoid an unintentional destruction of the vacuum established inside of the film holders.

As mentioned above, reference character 1' has been applied to indicate a relatively small upper plate and reference character 2' has been applied to indicate a relatively large lower plate projecting outwardly beyond the upper plate 2'. Intensifying foils 5',6' and X-ray film 7' are sandwiched between plates 1' and 2' and the elastomeric or plastic sealing body 3' is arranged on the portion of plate 2' projecting beyond plate 1'. Plate 1' is provided with a fold or crease 10' which conforms to the shape of plate 1' and is closed in itself. This fold or crease 10' tends to increase the dimensional stability of plate 1' and positions the sealing body 3' thereon. The dimensional stability of plate 2' is further increased on account of the fact that its outer edge is crimped or bent 90° out of the general plane of plate 2'. This has been indicated at 12'. The upward crimped or bent edge 12' of plate 2' positions the outer circumference of sealing body 3' which is preferably vulcanized to plate 2'.

The upper plate 1' is made up of an inner plate unit and an outer plate unit 13' framing the inner plate unit. Both plate units are attached to one another by flexible means, e.g. flexible tape 14 of which one side is affixed to the inner plate unit and the other side is affixed to the outer frame-like plate unit 13' surrounding the inner plate unit. The outer edge 11' of the outer plate unit 13' is crimped or bent 90° out of the general plane of upper plate 1'. This increases the dimensional stability of frame-like plate unit 13'. The edge 11' which projects 90° out of the general plane of upper plate 1 is pressed under considerable pressure into sealing body 3' upon evacuation of the interplate cavity 9', and thus forms a means to improve the sealing action of sealing body 3'.

The fact that plate 1' is formed of two parts which are flexibly joined together at 14' is of considerable significance because it allows a variation of the thickness formed by the stack 5,7,6 of intensification foils and X-ray film without imposing the film holder to undue stresses and strains.

The depth of fold or crease 10' may be small, and need not to be larger than the thickness of the material of which plate 2 is made. The same applies to the depth of bent portion 12' of plate 2' and the bent portion 11' of the upper plate 1'.

It will be noted that in the structure of FIGS. 1 and 2 the sealing body 3' is affixed to the lower and larger plate 2' of the pair of plates 1',2'.

The center regions of the plates 1',2' forming clamping means for the X-ray sensitive film and the intensifying foils must be strictly planar, and deviations from this requirement are only permissible for regions of plates 1',2' which are situated outside the above clamping regions.

The fold means or crease 10' of the structure of FIGS. 3 and 4 is spaced equidistantly from the upstanding edge 12' so that sealing body 3' is framed by parts 10' and 12'.

It will be noted that no check-valve-controlled duct is shown in the structure of FIGS. 1 and 2 to evacuate the space bounded by parts 1',2',3' by means of a vacuum pump, and a hose attached to such a duct and the pump. Such a duct and check valve are optional, but not mandatory in the particular structure of FIGS. 1 and 2. The space bounded by parts 1',2',3' may be evacuated by a suction hose and a vacuum pump of which the former is inserted into the interface between sealing body 3' and plate 1'.

Regarding the structure of FIGS. 1 and 2, it will be noted that the height of body 3' exceeds that of parts 10' and 12' and that the width of body 3' exceeds its height.

To prepare the film holder for use, the film 7' is placed on the lower plate 2' supporting intensification foil 6'. Thereupon the upper plate 1' and intensification foil 5' are placed upon film 7'. Following these steps the space between parts 1',2',3' is evacuated, as indicated above. As a result, plates 1',2' are tightly pressed together by atmospheric air pressure prevailing outside the film-receiving cavity 9' and this pressure is evenly transmitted to foils 5',6' and to film 7'.

I claim as my invention:

1. In a vacuum film holder for X-ray films and intensifying foils having a cavity adapted to be evacuated, said holder including clamping plates for exerting pressure upon X-ray films and intensifying foils inside said holder in response to evacuation of said cavity, wherein the improvement comprises
    a. a pair of separate and separable superimposed clamping plates including an upper plate having a relatively small surface area and a lower plate having a relatively large surface area, said pair of plates being arranged so that the outline of said upper plate lies within the outline of said lower plate and a peripheral area of said lower plate projects beyond said upper plate;
    b. a sealing projection extending from said upper plate along the periphery thereof substantially at right angles to the general plane of said upper plate toward said peripheral area of said lower plate; and
    c. a sealing body of an elastomeric material having a base surface coextensive with said peripheral area of said lower plate in abutting relation with said peripheral area of said lower plate and affixed to said lower plate, said sealing body having a considerably larger width measured in a direction parallel to the plane defined by said lower plate than the width thereof measured at right angles to said direction, and said sealing body having a surface remote from said lower plate arranged in such a way that said sealing projection penetrates into said sealing body when atmospheric pressure exceeds the pressure inside the space bounded by said pair of clamping plates and said sealing body.

2. In a vacuum film holder for X-ray films and intensifying foils having a cavity for housing said films and foils and being adapted to be evacuated by a vacuum pump wherein the improvement comprises
    a. a pair of separate and separable clamping plates for applying clamping pressure upon said film and foils;
    b. one of said pair of plates having an upstanding projection of predetermined height substantially at right angles to the general plain defined by said one of said pair of plates and extending along the entire periphery of said one of said pair of plates, and said one of said pair of plates further forming a fold of predetermined height extending parallel to said projection and forming jointly with said projection a pair of equidistantly spaced abutments;
    c. a frame-like sealing body of an elastomeric material supported by said one of said pair of plates, said sealing body having a height in excess of said predetermined height of said projection and in excess of said predetermined height of said fold of said one of said pair of plates and said sealing body having a base surface abutting against said one of said pair of plates, said sealing body further having a width at said base surface thereof substantially equal to the distance between said upstanding projection and said fold of said one of said pair of plates, and said sealing body being arranged inside of the space bounded by said upstanding projection and by said fold of said one of said pair of plates and positioned relative to said one of said pair of plates by said upstanding projection and by said fold thereof; and
    d. the other of said pair of plates having a frame-like projection extending along the entire periphery thereof and adapted to engage under pressure the surface of said sealing body remote from said one of said pair of plates.

3. A film holder as specified in claim 2 wherein any passage means projecting through one said pair of plates or projecting through said sealing body for evacuating the space bounded by said pair of plates and by said sealing body is dispensed with.

4. A film holder as specified in claim 3 wherein said other of said pair of plates includes a central portion for applying pressure on said films and on said foils and a separate peripheral portion for engaging said sealing body, and flexible means joining said central portion and said peripheral portion.

\* \* \* \* \*